B. W. GAMMON.
GOGGLES.
APPLICATION FILED JAN. 4, 1918.
1,272,939.
Patented July 16, 1918.
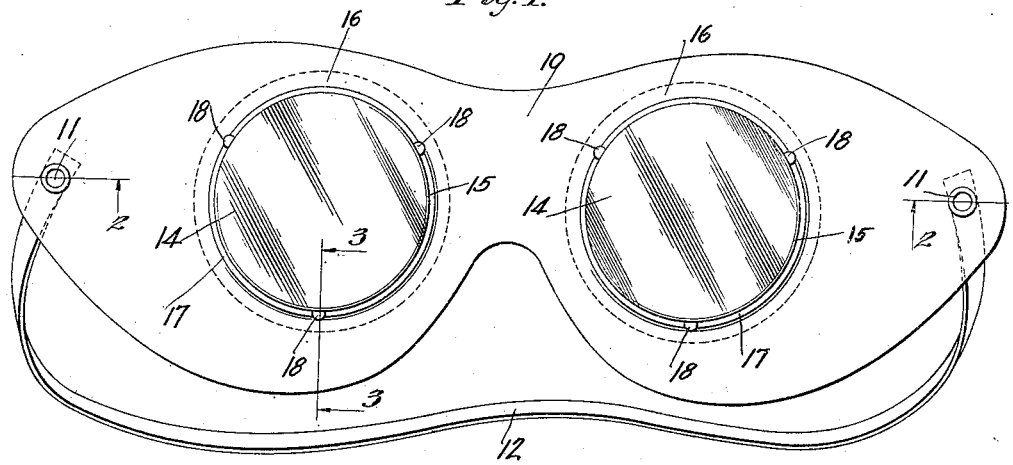
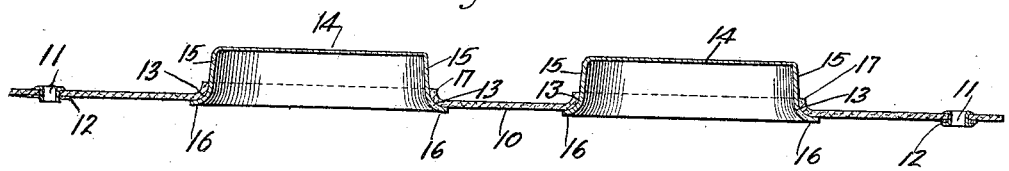
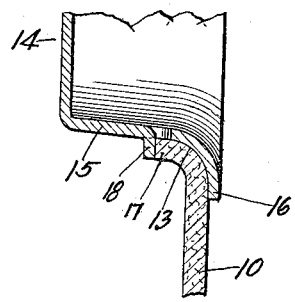
WITNESSES
INVENTOR
Benjamin Wells Gammon
BY
ATTORNEYS

UNITED STATES PATENT OFFICE.

BENJAMIN WELLS GAMMON, OF BROOKLYN, NEW YORK.

GOGGLES.

1,272,939.  Specification of Letters Patent.  Patented July 16, 1918.

Application filed January 4, 1918. Serial No. 210,319.

*To all whom it may concern:*

Be it known that I, BENJAMIN WELLS GAMMON, a citizen of the United States, and a resident of the city of New York, borough of Brooklyn, in the county of Kings and State of New York, have invented a new and Improved Goggles, of which the following is a full, clear, and exact description.

The object of the invention is to provide a new and improved goggle or eye shield arranged to provide a complete protection for the eyes of the wearer and one that is not liable to be affected by the changes in the weather and preventing precipitation from accumulating on the lenses. Another object is to permit of cheaply manufacturing the goggle and to render the same practically unbreakable.

In order to accomplish the desired result, the lenses are made of celluloid or similar diaphanous material and are cup-shaped, and have their side walls fitting the walls of the openings in the goggle frame to project the lenses beyond the front face of the goggle frame.

A practical embodiment of the invention is represented in the accompanying drawings forming a part of this specification, in which similar characters of reference indicate corresponding parts in all the views.

Figure 1 is a front elevation of the goggle;

Fig. 2 is an inverted sectional plan view of the same on the line 2—2 of Fig. 1; and Fig. 3 is an enlarged cross section of the same on the line 3—3 of Fig. 1.

The goggle frame 10 is preferably made of a single piece of leather or a similar flexible material and is provided on the ends with eyelets 11 for attaching the ends of a holding band 12 in position on the frame to permit the user to securely hold the goggle frame in position on the head. The goggle frame 10 is provided with spaced openings 13 for the reception of cup-shaped lenses 14 each preferably made of non-breakable diaphanous material such as transparent celluloid. The side wall 15 of each cup-shaped lens 14 terminates in an annular outwardly extending flange 16 engaging the back of the goggle frame 10, as plainly indicated in the drawings.

In the manufacture of the goggle, the side wall 15 of each cup-shaped lens is of a larger exterior diameter than that of the corresponding opening 13, and in order to attach each lens to the goggle frame 10 it is necessary to force the lens through the opening 13 from the back of the goggle frame to expand the wall 17 of the opening 13, and to bend such wall in an outward direction and to engage said wall with the side wall 15 of the lens with sufficient force to hold the lens in place without further fastening devices such as glue or other adhesive substances. It is understood that in attaching a lens 14 to the goggle frame 10 the same is forced through the opening 13 until the flange 16 snugly fits against the back of the goggle frame, and the wall 17 engages the exterior of the lens side wall 15 with sufficient frictional force to securely hold the lens in place. An additional fastening means is preferably provided for holding each lens 14 in place on the goggle frame 10, and this additional fastening means is preferably in the form of a number of lugs 18 struck up from the side wall 15 of the lens and bent outward over the edge of the wall 17 thus holding the lens in position on the goggle frame.

The goggle frame shown and described can be cheaply manufactured and is practically non-breakable, at the same time providing a wide range of views, especially as the side walls 15 are of transparent material and project beyond the front face of the goggle frame 10. It will be noticed also that the lenses are not liable to be affected by the weather and precipitation is not liable to settle on the lenses.

The lenses may be of different colors for protecting the eyes from bright lights such as the rays of the sun, glare of the roadway, etc.

By making the goggle frame 10 of leather or similar flexible material, it can be readily doubled up to permit of conveniently carrying the goggle in a pocket or other receptacle.

Having thus described my invention, I claim as new and desire to secure by Letters Patent:—

1. A goggle, comprising a frame, of flexible material and having spaced openings, and cup-shaped lenses of diaphanous material and having their side walls curved outwardly and terminating in annular flanges, the lenses being of a diameter greater than the openings of the frame, so that when they are forced into the openings of the frame the walls of the said openings will be curved outwardly and into engagement with the side walls and flanges of the lenses, with sufficient frictional force to hold the lenses in the openings.

2. A goggle, comprising a goggle frame having spaced openings and cup-shaped lenses made of diaphanous material and having their side walls fitting the walls of the said openings to project the lenses beyond the front face of the said goggle frame, and integral fastening means on the said side walls of the lenses engaging the said goggle frame to hold the lenses in place on the goggle frame.

3. A goggle, comprising a goggle frame of a flexible material and having spaced openings and cup-shaped lenses of celluloid having their side walls snugly fitting the walls of the said openings to project the lenses beyond the front face of the said frame, the side walls of the lenses terminating in flanges fitting against the back of the frame, and the said side walls of the lenses having struck-up fastening lugs engaging the edges of the walls of the openings in the goggle frame.

4. A goggle, comprising a frame of flexible material and having spaced openings, and cup-shaped lenses of diaphanous material and terminating in flanges engaging the back of the frame, the lenses being of a diameter greater than that of the openings so that when forced into the openings the walls thereof will be forced outward to form flanges engaging the lenses, the walls of the lenses having a plurality of struck-up lugs engaging the edges of the flanges of the frame.

BENJAMIN WELLS GAMMON.

Copies of this patent may be obtained for five cents each, by addressing the "Commissioner of Patents, Washington, D. C."